US010175970B2

(12) United States Patent
Li et al.

(10) Patent No.: US 10,175,970 B2
(45) Date of Patent: Jan. 8, 2019

(54) METHOD, DEVICE AND SYSTEM FOR UPDATING SOFTWARE CONFIGURATION PARAMETERS

(71) Applicant: Tencent Technology (Shenzhen) Company Limited, Shenzhen (CN)

(72) Inventors: Deyuan Li, Shenzhen (CN); Wenrui Zhang, Shenzhen (CN); Wei Mao, Shenzhen (CN); Qiang Lu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 48 days.

(21) Appl. No.: 15/184,791

(22) Filed: Jun. 16, 2016

(65) Prior Publication Data

US 2016/0291965 A1    Oct. 6, 2016

Related U.S. Application Data

(63) Continuation of application No. PCT/CN2014/095216, filed on Dec. 27, 2014.

(30) Foreign Application Priority Data

Jan. 2, 2014  (CN) .......................... 2014 1 0003708

(51) Int. Cl.
*G06F 8/65* (2018.01)
*G06F 8/71* (2018.01)
(Continued)

(52) U.S. Cl.
CPC .................. *G06F 8/65* (2013.01); *G06F 8/71* (2013.01); *G06F 9/445* (2013.01); *H04L 67/34* (2013.01); *H04L 67/42* (2013.01)

(58) Field of Classification Search
CPC .......... G06F 8/60–8/70; G06F 9/44505; H04L 67/34; H04L 67/42
(Continued)

(56) References Cited

U.S. PATENT DOCUMENTS 6,725,229 B2    4/2004  Majewski et al.
7,692,106 B2 *  4/2010  Rindermann ...... G01G 23/3707
                                                     177/25.13
(Continued)

FOREIGN PATENT DOCUMENTS

CN    1848761 A       10/2006
CN    101950254 A      1/2011
CN    103064712 A      4/2013

OTHER PUBLICATIONS

Holmes, J., Struts: The Complete Reference, McGraw-Hill/Osborner, 2004, 504 pages, [retrieved on Mar. 22, 2018], Retrieved from the Internet: <URL:https://ezhiInnovativeblog.files.wordpress.com/2012/04/struts-the-complete-reference.pdf>.*
(Continued)

*Primary Examiner* — Geoffrey R St Leger
(74) *Attorney, Agent, or Firm* — Morgan, Lewis & Bockius LLP

(57) ABSTRACT

A method for updating a configuration of software is disclosed. The method is performed at a terminal device having one or more processors and memory for storing programs to be executed by the one or more processors. The method includes sending, to a server device, a request for updating the software configuration. The request includes a version number of a software configuration parameter group, which includes a group of parameters associated with the software configuration. The method also includes receiving, from the server device and in response to the request, data of the software configuration parameter group and a latest version number of the software configuration parameter group when (Continued)

that latest version number is different than the version number included in the request. The method further includes updating the software configuration based on the received data, and updating the version number based on the received latest version number.

17 Claims, 7 Drawing Sheets

(51) Int. Cl.
　　　*G06F 9/445*　　　(2018.01)
　　　*H04L 29/08*　　　(2006.01)
　　　*H04L 29/06*　　　(2006.01)
(58) Field of Classification Search
　　　USPC .................................................. 717/168–178
　　　See application file for complete search history.

(56) References Cited

U.S. PATENT DOCUMENTS

| | | | | |
|---|---|---|---|---|
| 8,065,704 | B2* | 11/2011 | Zhang | H04N 7/17318 717/170 |
| 8,869,239 | B2* | 10/2014 | Pahlavan | G06F 9/4445 709/219 |
| 9,405,791 | B2* | 8/2016 | Fierro | G06F 8/65 |
| 2006/0069836 | A1* | 3/2006 | Seo | G06F 8/65 710/302 |
| 2009/0008156 | A1* | 1/2009 | Rindermann | G01G 23/3707 177/25.13 |
| 2009/0037824 | A1* | 2/2009 | Vedula | G06F 11/302 715/736 |
| 2013/0262119 | A1* | 10/2013 | Latorre-Martinez et al. | G10L 13/08 704/260 |
| 2014/0007074 | A1* | 1/2014 | Sporkert | G06F 8/68 717/172 |
| 2014/0052702 | A1* | 2/2014 | Fierro | G06F 8/65 707/695 |
| 2015/0154016 | A1* | 6/2015 | Liang | G06F 8/65 717/169 |
| 2015/0326432 | A1* | 11/2015 | Fujie | G06F 9/44505 709/222 |

OTHER PUBLICATIONS

Nguyen, T., et al., An Infrastructure for Development of Object-Oriented, Multilevel Configuration Management Services, Proceedings of the 27th international conference on Software engineering, 2005, pp. 215-224, [retrieved on Sep. 12, 2018], Retrieved from the Internet: <URL:http://dl.acm.org/>.*

Tencent Technology, ISRWO, PCT/2014/095216, dated Feb. 2, 2015, 8 pgs.

Tencent Technology, IPRP, PCT/2014/095216, dated Jul. 5, 2016, 6 pgs.

* cited by examiner

METHOD, DEVICE AND SYSTEM FOR UPDATING SOFTWARE CONFIGURATION PARAMETERS

PRIORITY CLAIM AND RELATED APPLICATION

This application is a continuation application of PCT Patent Application No. PCT/CN2014/095216, entitled "METHOD, DEVICE AND) SYSTEM FOR UPDATING SOFTWARE CONFIGURATION PARAMETERS" filed on Dec. 27, 2014, which claims priority to Chinese Patent Application Serial No. 201410003708.2, entitled "METHOD, TERMINAL SERVER AND SYSTEM FOR UPDATING SOFTWARE CONFIGURATION PARAMETERS", filed on Jan. 2, 2014, both of which are incorporated herein by reference in their entirety.

FIELD OF THE APPLICATION

The present application generally relates to the field of technologies for software upgrade, and more particularly to a method, system and devices (e.g., terminal devices, server devices) for updating a configuration of software.

BACKGROUND

Some known software installed at a terminal device has fixed values for its software configuration parameters. Such software typically does not enable dynamic updates on a single software configuration parameter or a portion of the software configuration parameters. Instead, a full-scale software upgrade is generally required to perform any update of the software configuration parameters. Such a mechanism for updating software configuration parameters, however, typically requires a download of a complete, latest software package, thus causing low efficiency for updating software configuration parameters of the software.

Therefore, a need exists for a method, system and devices that can dynamically update software configuration parameters without performing a full-scale software upgrade.

SUMMARY

The above deficiencies associated with the known software may be addressed by the techniques described herein.

In some embodiments, a method for updating a configuration of software installed at a terminal device is disclosed. The method is performed at the terminal device, which has one or more processors and memory for storing programs to be executed by the one or more processors. The method includes sending, to a server device, a request for updating the configuration of the software. The request includes at least a version number of a software configuration parameter group, where the software configuration parameter group includes a group of parameters associated with the configuration of the software.

In some instances, at least one configuration parameter of the software is excluded from the software configuration parameter group. In some instances, the software configuration parameter group is from multiple software configuration parameter groups. Each software configuration parameter group from the multiple software configuration parameter groups includes a predefined group of parameters associated with the configuration of the software.

In some instances, the terminal device sends the request in response to receiving, from the server device, an indication that the version number of the software configuration parameter group has been updated at the server device. In some other instances, the terminal device sends the request to the server device in accordance with a predefined periodic schedule.

The method also includes receiving data of the software configuration parameter group and a latest version number of the software configuration parameter group when the latest version number of the software configuration parameter group is different than the version number of the software configuration parameter group included in the request. The data and the latest version number are received from the server device and in response to the request. The method further includes updating the configuration of the software based on the received data of the software configuration parameter group, and updating the version number of the software configuration parameter group based on the received latest version number of the software configuration parameter group.

In some instances, the data of the software configuration parameter group includes an application procedure control code associated with an application of the software. In such instances, the method includes determining an association between the application procedure control code and a responding procedure. The method further includes determining the responding procedure based on the application procedure control code and the association when the application of the software is executed at the terminal device.

In some embodiments, another method for updating a configuration of software installed at a terminal device is disclosed. The method is performed at a server device having one or more processors and memory for storing programs to be executed by the one or more processors. The method includes receiving, from the terminal device, a request for updating the configuration of the software. The request includes at least a version number of a software configuration parameter group, where the software configuration parameter group includes a group of parameters associated with the configuration of the software.

The method also includes comparing the version number of the software configuration parameter group included in the request with a latest version number of the software configuration parameter group stored at the server device. The method further includes sending, to the terminal device and in accordance with a determination of the version number included in the request being different from the latest version number stored at the server device, data of the software configuration parameter group and the latest version number of the software configuration parameter group. As a result, the terminal device updates the configuration of the software based on the data of the software configuration parameter group, and updates the version number of the software configuration parameter group based on the latest version number of the software configuration parameter group.

In some embodiments, a server device is disclosed. The server device includes one or more processors and memory storing one or more programs for execution by the one or more processors. The one or more programs include instructions that cause the server device to perform the method for updating a configuration of software installed at a terminal device as described above.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the application when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
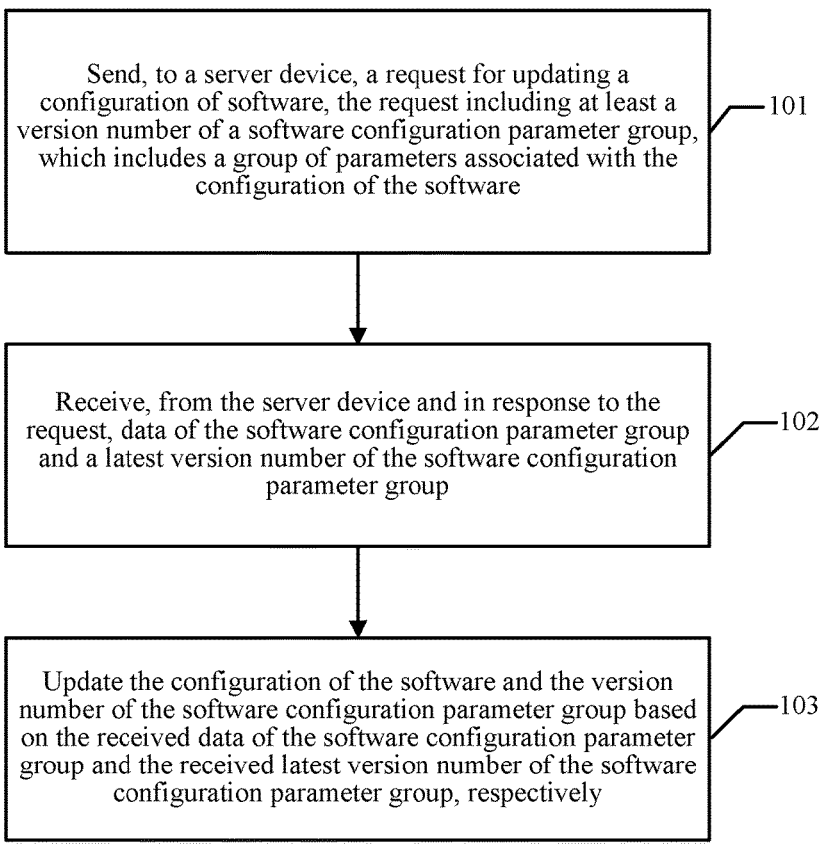
FIG. 1 is a flow chart illustrating a method performed at a terminal device for updating a configuration of software installed at the terminal device in accordance with some embodiments.

FIG. 1 is a flow chart illustrating a method 100 performed at a terminal device for updating a configuration of software installed at the terminal device in accordance with some embodiments. The terminal device performing the method 100 can be any type of electronic device on which software can be installed, maintained, upgraded and executed. Such a terminal device can be configured to communicate with one or more server device(s) via one or more network(s) (e.g., the Internet). The terminal device can be configured to interact with one or more users operating the terminal device to install software on the terminal device, and to maintain, upgrade, and execute the software at the terminal device. A user operating the terminal device performing the method 100 can be any person (potentially) interested in using, maintaining and/or upgrading the software installed at the terminal device. Details of a system including a terminal device and a server device configured to install, maintain, upgrade and execute software are shown and described below with respect to FIG. 12.

In some embodiments, the terminal device performing the method 100 can be, for example, a cellular phone, a smart phone, a mobile Internet device (MID), a personal digital assistant (PDA), a tablet computer, an e-reader, a laptop computer, a handheld computer, a wearable device, a desktop computer, a vehicle terminal, and/or any other electronic device. In some embodiments, such a terminal device can be referred to as, for example, a client device, a user device, a mobile device, a portable device, as terminal, and/or the like. Details of a terminal device are shown and described below with respect to FIGS. 4-6 and 10.

Software can be installed, maintained, upgraded and/or executed at a terminal device in various suitable methods. In some embodiments, a single software application can be installed at a terminal device. In such embodiments, the software application is typically maintained, upgraded and/or executed independent with other software applications. For example, Microsoft Internet Explorer (IE), a graphic web browser, can be installed and used as a single software application at a terminal device. In some other embodiments, a software pack including multiple software applications can be installed as a package at a terminal device. In such embodiments, one or more software applications included in the software pack can be maintained and/or upgraded together (i.e., at substantially the same time). For example, Microsoft Office, an office suite of software applications (e.g., Microsoft Word, Microsoft Excel, Micro soft PowerPoint, etc.), can be installed and used as a software pack at a terminal device. One or multiple of the software applications included in the Microsoft Office suite can be upgraded together at the terminal device.

A server device communicating with the terminal device performing the method 100 can be any type of device configured to function as a server-side device to enable and/or assist upgrading of software that is installed at the terminal device. Such a server device can typically be configured to communicate with multiple terminal devices via one or more networks. In some embodiments, the server device can be, for example, an application server, a background server, a back end server, a database server, a workstation, a desktop computer, a cloud computing server, a data processing server, an instant messaging server, a Social Networking Service (SNS) server, and/or the like. In some embodiments, a server device can be a server cluster or server center consisting of two or more servers (e.g., an application server and a database server). Details of a server device are shown and described below with respect to FIGS. 7-9 and 11.

A network connecting the terminal device and the server device can be any type of network configured to operatively couple one or more server devices to one or more terminal devices, and enable communications between the server device(s) and the terminal device(s). In some embodiments, such a network can include one or more networks such as, for example, a cellular network, a satellite network, a local area network (LAN), a wide area network (WAN), a wireless local area network (WLAN), Internet, etc. In some embodiments, such a network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-FL, voice over internet protocol (VoIP), Wi-MAX, etc.

In some embodiments, the terminal device performing the method 100 can include one or more processors and memory. In such embodiments, the method 100 is governed by instructions or code of an application that are stored in a non-transitory computer readable storage medium of the terminal device and executed by the one or more processors of the terminal device. The application is associated with updating configuration parameters for software installed at the terminal device. Such an application typically has a server-side portion that is stored in and/or executed at the server device, and a client-side portion that is stored in and/or executed at the terminal device. As a result of the client-side portion of the application being executed, the method 100 is performed at the terminal device. As shown in FIG. 1, the method 100 includes the following steps.

At 101, the terminal device sends a request for updating a configuration of software to the server device. The request includes at least a version number of a software configuration parameter group, which includes a group of parameters associated with the configuration of the software. In some embodiments, an initial version number (e.g., 1.0) can be assigned to each software configuration parameter group of a software application (or a software pack, a software suite) when that software application (or software pack, software suite) is initially installed at a terminal device. In such embodiments, the same initial version number can be stored, at a server device, in association with the corresponding software configuration parameter group. Subsequently, each time the data (e.g., parameter values) of the software configuration parameter group is updated (e.g., by a developer of the software) at the server device, the version number of that software configuration parameter group is also updated at the server device accordingly. Thus, updates on software configuration parameters can be tracked at the server device. In some embodiments, at any given time, a software configuration parameter group has one and only one version number stored at the terminal device, and one and only one version number stored at the server device. In such embodiments, such a version number stored at the terminal device is a current version number of the software configuration parameter group, and such a version number stored at the server device is a latest version number of the software configuration parameter group. In some embodiments, as described herein, a current version number of a software configuration parameter group stored at a terminal device is not necessarily the same as a latest version number of the same software configuration parameter group stored at a server device.

As discussed above, the software described herein can be a single software application (e.g., Microsoft IE), a software pack (e.g., Microsoft Office suite), a group of multiple software applications (e.g., a group of software developed by the same developer, a group of software installed around the same time, a group of software with the same schedule for upgrading, etc.), and/or any other suitable combination of software applications. Accordingly, the request can be associated with updating configuration(s) for a single software application or multiple software applications.

In some embodiments, the software configuration parameter group can be from a set of multiple software configuration parameter groups. Each software configuration parameter group from the set of multiple software configuration parameter groups includes a group of parameters associated with the configuration of the software, which are mutually exclusive from each other. In other words, each parameter associated with the configuration of the software is included in one and only one software configuration parameter group from the set of software configuration parameter groups. In such embodiments, each software configuration parameter group typically represents (e.g., includes parameters associated with) a portion (e.g., a component, a function, a module, etc.) of the software. Thus, updating parameters of a single software configuration parameter group does not trigger a full-scale upgrade of the software.

In some embodiments, each software configuration parameter group from the set of software configuration parameter groups includes a predefined group of parameters associated with the configuration of the software. In such embodiments, parameters associated with the configuration of the software can be categorized and grouped into the various predefined groups (i.e., software configuration parameter groups) in any suitable method.

In some instances, for a software suite including multiple software applications, each predefined group of parameters includes parameters associated with a particular software application from the multiple applications. For example, for parameters associated with configurations for the Microsoft Office suite including Microsoft Word, Microsoft Excel and Microsoft PowerPoint, a first predefined group of parameters includes parameters associated with configuration of Microsoft Word; a second predefined group of parameters includes parameters associated with configuration of Microsoft Excel; and a third predefined group of parameters includes parameters associated with configuration of Microsoft PowerPoint.

In some instances, for a single software application, each predefined group of parameters includes parameters associated with, for example, a function, a portion, a module, a component, an aspect, etc., of that software application. For example, for parameters associated with configuration for the Microsoft IE, a first predefined group of parameters includes parameters associated with security settings of the Microsoft IE; a second predefined group of parameters includes parameters associated with user interface of the Microsoft IF; a third predefined group of parameters includes parameters associated with communication protocols of the Microsoft IE; and the like.

In some embodiments, the request can be associated with updating parameters of a single software configuration parameter group, but not updating any parameter excluded from that software configuration parameter group (i.e., included in other software configuration parameter groups). In such embodiments, the request includes a version number of that software configuration parameter group, but not any version number of any other software configuration parameter group. As a result, parameters of that single software configuration parameter group, but no parameter of any other software configuration parameter group, will be updated at the terminal device.

In some other embodiments, the request can be associated with updating parameters from multiple software configuration parameter groups. In such embodiments, the request includes a current version number of each of the multiple software configuration parameter groups. As a result, parameters of those multiple software configuration parameter groups, but no parameter of any other software configuration parameter group, will be updated at the terminal device.

In some embodiments, parameters associated with software configuration are updated (constantly, periodically, or repeatedly, etc.) at a terminal device. As a result, the terminal device keeps updating version number(s) of software configuration parameter group(s) associated with the software configuration. In such embodiments, a version number included in a request is a current version number (i.e., an up-to-date version number) of a software configuration parameter group instead of an outdated version number (i.e., a previously-used version number) of that software configuration parameter group.

Sending a request for updating software configuration can be triggered at a terminal device by various events and/or in various methods. In some embodiments, a terminal device can send a request for updating parameters of a software configuration parameter group in response to receiving from a server device an indication that the software configuration parameter group has been recently updated at the server device. For example, after updating parameter(s) of a software configuration parameter group, a server device can send a signal to each terminal device at which the associated software has been installed and actively executed. The signal is to indicate to those terminal devices that parameter(s) of the software configuration parameter group have been updated at the server device, thus triggering those terminal devices to update that software configuration parameter group by performing the method 100. As a result, each terminal device sends, to the server device and in response to the signal, a request for updating parameters of the software configuration parameter group. In some other embodiments, a terminal device can send a request for updating parameters of a software configuration parameter group in accordance with, for example, a predefined periodic schedule. For example, a terminal device automatically sends, to a server device, a request for updating of a software configuration parameter group every 10 days.

In yet some other embodiments, a terminal device can be triggered to send a request for updating parameters of a software configuration parameter group by any other suitable event and/or factor. Such an event or factor can be associated with, for example, a timing factor, a position or movement of the terminal device (e.g., being shaken, proximate to a Bluetooth hotspot, etc.), a status of the terminal device (e.g., fully Charged), a geographic location of the terminal device, a character of a user operating the terminal device, a change in a surrounding condition or scenario, and/or the like. For example, a terminal device automatically sends, to a server device, a request for updating of a software configuration parameter group whenever the terminal device is rebooted or whenever the terminal device is reconnected to a certain network (e.g., a home Wi-Fi network). For another example, a terminal device is automatically triggered to perform the method 100 for updating parameters associated with a language package (e.g., Chinese) when the terminal device is detected to have been moved into a territory associated with that language package (e.g., China).

For yet another example, a terminal device is automatically triggered to update parameters of a service (e.g., parental control) when a switch of users (e.g., from an adult to a kid) for the terminal device is detected.

In some embodiments, a terminal device can be triggered to send requests for updating parameters of a software configuration parameter group by a combination of various events. For example, a terminal device can be (passively) triggered to send a request in response to receiving an indication that the software configuration parameter group has been recently updated at a server device. Meanwhile, the terminal device can (actively) automatically send a request after a certain period of time (e.g., 3 days) since the last time of the software configuration parameter group being updated.

In some embodiments, a terminal device updating parameters of a software configuration parameter group associated with software (e.g., a single software application, a software pack) is different from the terminal device performing a full-scale upgrade on the software. In one aspect, as described above, parameters of a software configuration parameter group associated with the software constitute a pure subset of all parameters associated with configuration of the software. Thus, updating parameters of a software configuration parameter group is not as comprehensive as (e.g., potentially affect fewer parameters than) a full-scale software upgrade.

In another aspect, conditions and/or events to trigger updating parameters of a software configuration parameter group can be different than conditions and/or events to trigger a full-scale software upgrade. For example, updating parameters of a software configuration parameter group is conditioned on existence of any type of connection (e.g., a wireless connection, a wired connection) between the terminal device and the server device; while a software upgrade is conditioned on existence of only a high-Speed and reliable connection (e.g., a wired connection, a Wi-Fi connection) between the terminal device and the server device. For another example, updating parameters of a software configuration parameter group does not require any user approval; while a software upgrade requires a specific user approval. For yet another example, updating parameters of a software configuration parameter group can occur anytime in response to corresponding parameters having been updated at the server device; while a software upgrade can occur only in accordance with a predefined schedule (e.g., every 20 days).

At 102, the terminal device receives, from the server device and in response to the request, data of the software configuration parameter group and a latest version number of the software configuration parameter group. The data of the software configuration parameter group can include, for example, values of parameters included in the software configuration parameter group, which are currently stored at the server device. In other words, the data of the software configuration parameter group can include up-to-date values of parameters of the software configuration parameter group, in some embodiments, the data received at the terminal device can include other data and/or information associated with updating parameters of the software configuration parameter group at the terminal device. For example, the data can include instruction or code associated with updating the parameters, which is to be executed at the terminal device.

In some embodiments, as described below with respect to FIG. 2, the server device sends the data and the latest version number to the terminal device in accordance with a determination that the latest version number is different than the version number of the software configuration parameter group that is included in the request. Similarly stated, the server device sends the data and the latest version number to the terminal device in accordance with a determination that the data and the latest version number are more up-to-date than the corresponding data and version number stored at the terminal device. Otherwise, the server device can refrain from sending data or version number of the software configuration parameter group to the terminal device in accordance with a determination that the latest version number at the server device is identical to the version number included in the request, which indicates that data of the software configuration parameter group at the terminal device is up-to-date and identical (or substantially identical) to the corresponding data at the server device.

In some embodiments, the data received at the terminal device includes values of all parameters included in the software configuration parameter group. In other embodiments, the data received at the terminal device includes values of a portion of the parameters included in the software configuration parameter group. In such embodiments, for example, the server device can send values of parameters that have been recently updated since last update at the terminal device. On the contrary, the server device can refrain from sending values of parameters that have not been recently updated since last update at the terminal device. As a result, the data received at the terminal device includes only values of the newly-updated parameters, whose values stored at the server device are different than (i.e., have been updated from) the corresponding values stored at the terminal device. And, the data received at the terminal device does not include values of the non-updated parameters, whose values stored at the server device are the same as (i.e., have not been updated from) the corresponding values stored at the terminal device.

At 103, the terminal device updates the configuration of the software and the version number of the software configuration parameter group based on the received data of the software configuration parameter group and the received latest version number of the software configuration parameter group, respectively. Specifically, for each parameter whose newly-updated value being included in the received data, the terminal device replaces a currently-stored value of the parameter with the newly-updated value of the parameter that is included in the received data. Furthermore, the terminal device replaces the currently-stored version number of the software configuration parameter group (which is included in the request for updating software configuration at 101) with the latest version number of the software configuration parameter group that is received from the server device. Thus, the software configuration parameter group is updated at the terminal device. That is, each parameter of the software configuration parameter group has an up-to-date value that is stored at the server device, and the version number of the software configuration parameter group is updated to the latest version number that is stored at the server device.

Figure 2:
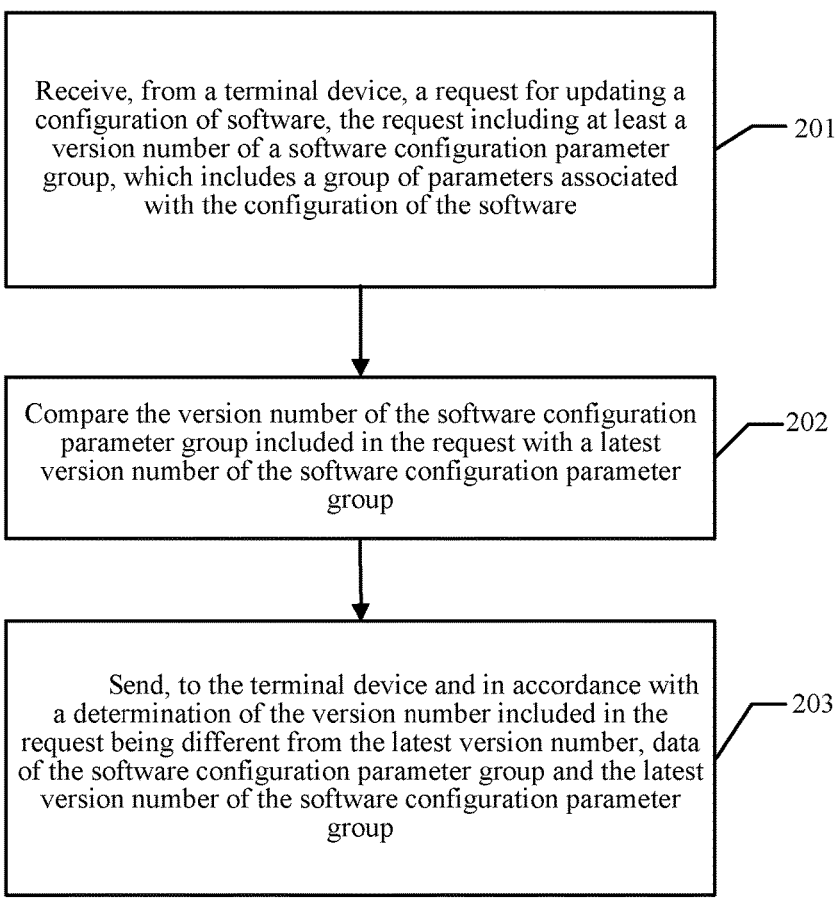
FIG. 2 is a flow chart illustrating a method performed at a server device for updating a configuration of software installed at a terminal device in accordance with some embodiments.

FIG. 2 is a flow chart illustrating a method 200 performed at a server device for updating a configuration of software installed at a terminal device in accordance with some embodiments. The server device performing the method 200 can be similar to the server device described above with respect to FIG. 1. Particularly, the server device performing the method 200 can be operatively coupled to and communicate with (e.g., via a network) one or More terminal devices that are similar to the terminal device described above with respect to FIG. 1.

In some embodiments, the server device performing the method 200 can include one or more processors and memory. In such embodiments, the method 200 is governed by instructions or code of an application that are stored in a non-transitory computer readable storage medium of the server device and executed by the one or more processors of the server device. The application is associated with updating configuration parameters for software installed at the terminal device. Such an application typically has a server-side portion that is stored in and/or executed at the server device, and a client-side portion that is stored in and/or executed at the terminal device. As a result of the server-side portion of the application being executed, the method 200 is performed at the server device. As shown in FIG. 2, the method 200 includes the following steps.

At 201, the server device receives from the terminal device a request for updating a configuration of software. The request includes at least a version number of a software configuration parameter group, which includes a group of parameters associated with configuration of the software. As described above with respect to 101 of the method 100 in FIG. 1, the terminal device can be triggered to send the request to the server device by various events and/or factors such as, for example, in response to receiving an indication of software update at the server device, in accordance with a predefined schedule, and/or the like. The version number included in the request is the current version number of the software configuration parameter group that is stored at the terminal device. Parameters included in the software configuration parameter group can be a pure subset of parameters associated with configuration of the software. Thus, updating values of parameters included in the software configuration parameter group is different from a full-scale software upgrade.

At 202, the server device compares the version number of the software configuration parameter group included in the request with a latest version number of the software configuration parameter group. The server device is configured to store, maintain and update a version number for each software configuration parameter group associated with the configuration of the software. Particularly, the server device is configured to update the version number of a software configuration parameter group in response to each update with one or more parameters of that software configuration parameter group at the server device. Thus, the server device stores the latest version number of each software configuration parameter group associated with the configuration of the software.

In some embodiments, version numbers of a software configuration parameter group can be in any suitable form that reflects the updates on parameters of the software configuration parameter group. For example, a version number of a software configuration parameter group can be changed from X.Y to X.Z (e.g., 1.4 to 1.5) to reflect a minor update on parameters (e.g., updates on values of a small number of parameters) of that software configuration parameter group, and changed from X.Y to Z.V (e.g., 1.9 to 2.0) to reflect a major update on parameters (e.g., updates on values of a substantial portion of parameters) of that software configuration parameter group. For another example, a version number of a software configuration parameter group can be represented by English alphabets (e.g., version A, version B, etc.), Greek alphabets (e.g., version alpha, version beta, etc.), and/or any other suitable symbols.

Additionally, in some embodiments, a version number of a software configuration parameter group can be represented using a combination of various types of symbols. For example, a version number of a software configuration parameter group can be changed from X.m to X.n to reflect a minor update on parameters of that software configuration parameter group, where X represents an English alphabet and m, n each represents an Arabic number such as A.1, A.2, etc.; and the same version number can be changed from X.m to Y.n to reflect a major update on parameters of that software configuration parameter group, where X, Y each represents an English alphabet and m, n each represents an Arabic number such as A.3, B.0, etc.

In response to receiving the request, the server device is configured to compare the version number of the software configuration parameter group that is included in the received request with the latest version number of the same software configuration parameter group that is stored in the server device. As a result, the server device determines whether the version number included in the received request is the same as the latest version number stored at the server device. Such a determination indicates whether data of the software configuration parameter group stored at the terminal device is up-to-date, or in other words, the same as the latest data of the same software configuration parameter group stored at the server device.

At 203, the server device sends to the terminal device data of the software configuration parameter group and the latest version number of the software configuration parameter group. The server device sends the data and the latest version number in accordance with a determination that the version number included in the request is different from the latest version number. Such a determination indicates that the data of the software configuration parameter group stored at the terminal device is outdated, or in other words, different from the latest data of the same software configuration parameter group stored at the server device. As described with respect to 103 of the method 100 in FIG. 1, in response to receiving the latest data and the latest version number of the software configuration parameter group, the terminal device can update its current data and version number of the software configuration parameter group accordingly.

Figure 3:
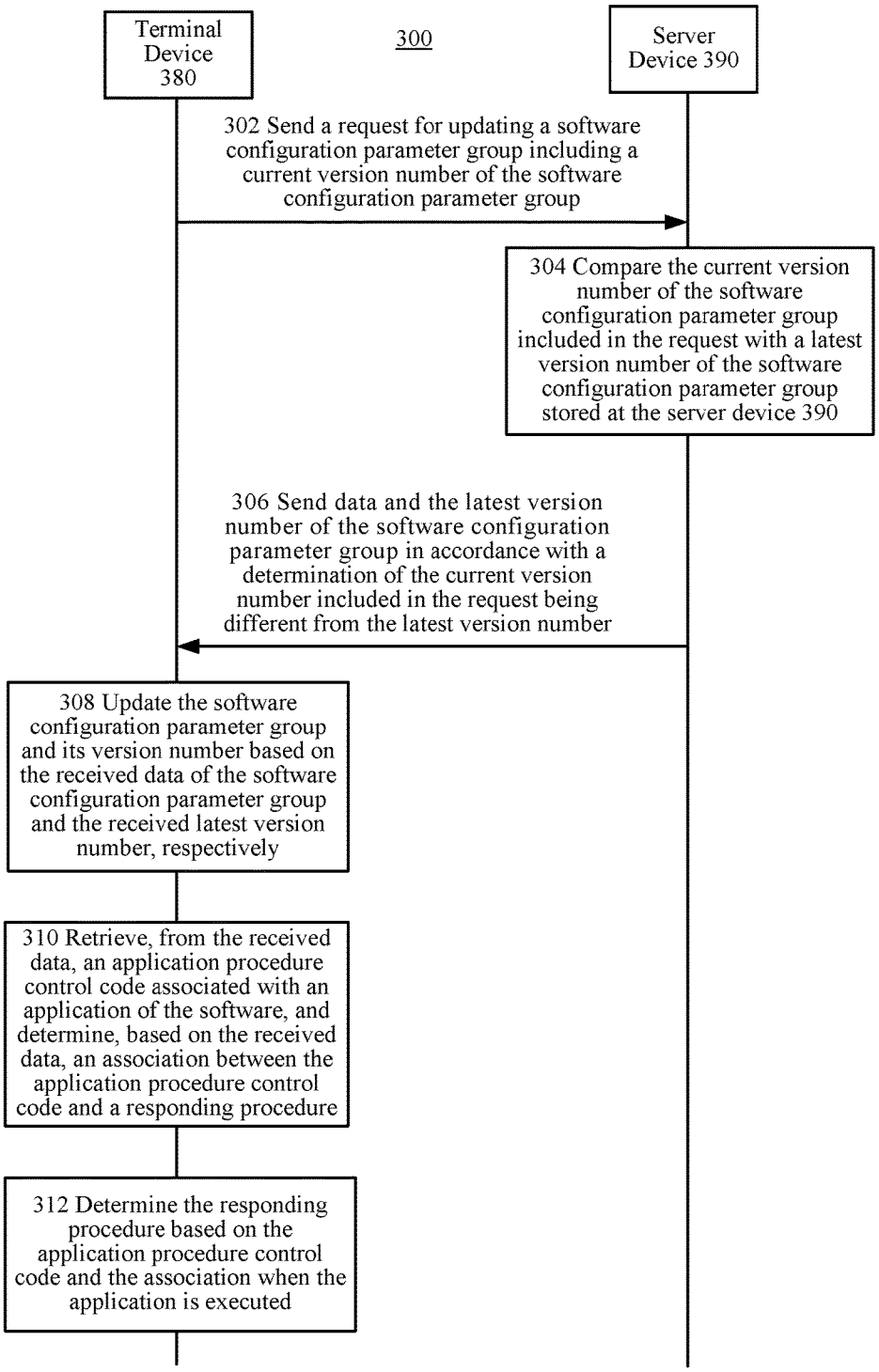
FIG. 3 is a flow chart illustrating a method performed at a terminal device and a server device for updating a configuration of software installed at the terminal device in accordance with some embodiments.

FIG. 3 is a flow chart illustrating a method 300 performed at a terminal device 380 and a server device 390 for updating a configuration of software installed at the terminal device 380 in accordance with some embodiments. The terminal device 380 is similar to the terminal devices described above with respect to FIGS. 1 and 2, and the server device 390 is similar to the server devices described above with respect to FIGS. 1 and 2. As shown in FIG. 3, the terminal device 380 is operatively coupled to and communicates with the server device 390 (e.g., via a network not shown in FIG. 3).

In some embodiments, the terminal device 380 and the server device 390 each includes one or more processors and memory. In such embodiments, the method 300 is governed by instructions or code of an application, which includes a server-side portion that is stored in and executed at the server device 390, and a client-side portion that is stored in and executed at the terminal device 380. As a result of the server-side portion of the application and the client-side portion of the application being executed at the server device 390 and the terminal device 380 respectively, the server device 390 and the terminal device 380 collectively perform the method 300. As shown in FIG. 3, the method 300 includes the following steps.

At 302, the terminal device 380 sends to the server device 390 a request for updating a software configuration parameter group. The request includes a current version number of the software configuration parameter group. As described above with respect to 101 of the method 100 in FIGS. 1 and 201 of the method 200 in FIG. 2, the terminal device 380 can be triggered to send the request to the server device 390 by various events and/or factors such as, for example, in response to receiving an indication of software update at the server device 390, in accordance with a predefined schedule, and/or the like.

At 304, the server device 390 compares the current version number of the software configuration parameter group included in the request with a latest version number of the software configuration parameter group stored at the server device 390. As described above with respect to 202 of the method 200 in FIG. 2, the server device 390 stores and updates the latest version number of the software configuration parameter group. The server device 390 compares the latest version number of the software configuration parameter group with the received version number of the same software configuration parameter group to determine whether data and version number of that software configuration parameter group stored at the terminal device 380 are up-to-date.

At 306, the server device 390 sends to the terminal device 380 data of the software configuration parameter group and the latest version number of the software configuration parameter group in accordance with a determination that the current version number included in the request is different from the latest version number. As described above with respect to 203 of the method 200 in FIG. 2, the server device 390 determines that the data and version number of that software configuration parameter group stored at the terminal device 380 are outdated based on the version number included in the received request being different from the latest version number stored at the server device 390. As a result, the server device 390 sends to the terminal device 380 the latest data and the latest version number of the software configuration parameter group.

At 308, the terminal device 380 updates the software configuration parameter group and its version number based on the received data of the software configuration parameter group and the received latest version number, respectively. As described with respect to 103 of the method 100 in FIG. 1, in response to receiving the latest data and the latest version number of the software configuration parameter group, the terminal device 380 updates its current data and version number of the software configuration parameter group accordingly. Specifically, the terminal device 380 replaces the currently-stored value(s) of parameter(s) of the software configuration parameter group with the newly-updated value(s) of the same parameter(s) that are included in the received data. Furthermore, the terminal device 380 replaces the currently-stored version number of the software configuration parameter group with the latest version number of the software configuration parameter group that is received from the server device 390.

In some embodiments, an application procedure control code is used to control execution of a responding procedure when the corresponding software application is executed at a terminal device. Such a responding procedure is a procedure (e.g., a user interface, a reacting operation, etc.) responding to a user operation when the software application is initiated or executed at the terminal device. In such embodiments, each distinctive responding procedure is associated with and/or controlled by a different application procedure control code. Thus, in order for a terminal device to execute a new responding procedure when executing the application, a server device typically provides an updated application procedure control code to the terminal device.

In some embodiments, although not shown in FIG. 3, the serer device 390 can be configured to define a new application procedure control code associated with the application based on updated parameters of the software configuration. The serer device 390 can also be configured to define or determine a new responding procedure associated with the application based on the updated parameters of the software configuration. Moreover, the server device 390 can be configured to define or determine an association between the newly-defined application procedure control code and the new responding procedure. The server device 390 can be configured to include both the newly-defined application procedure control code and the association in the data sent to the terminal device 380.

At 310, in responding to receiving the data, the terminal device 380 retrieves, from the received data, the newly-defined application procedure control code. The terminal device 380 also determines, based on the received data, the association between the newly-defined application procedure control code and the new responding procedure. Furthermore, at 312, the terminal device 380 determines the new responding procedure based on the retrieved application procedure control code and the determined association. As a result, the terminal device 380 can execute the new responding procedure when executing the application.

For example, before parameters of software configuration associated with a software application are updated, the software application is able to support online transaction services of four banks. Thus, in response to a user operation (e.g., a user's selection of an online transaction service by clicking a button on a user interface), the software application can initiate or execute a responding procedure for providing an online transaction service by displaying a user interface including online transaction interfaces for the four banks. Such a responding procedure can be associated with and/or controlled by an application procedure control code (e.g., 1) internally.

After parameters of the software configuration associated with the software application are updated at a server device, the software application is able to support online transaction services of six banks including the previous four banks and two new banks. The server device defines a new responding procedure for providing the online transaction service by displaying a new user interface including online transaction interfaces for the six banks. The server device also defines a new application procedure control code (e.g., 2) for the new responding procedure. The server device further defines an association between the new responding procedure and the new application procedure control code. Last, in response to a request from a terminal device, the server device sends to the terminal device data including the new application procedure control code and information of the association.

In response to receiving the data from the server device, the terminal device retrieves the new application procedure control code from the received data. The terminal device also determines the association based on the received data. The terminal device then determines the new responding procedure based on the retrieved new application procedure control code and the association. As a result, the terminal device can initiate or execute the new responding procedure (i.e., displaying the user interface including online transaction interfaces for the six banks) in response to the same user operation (e.g., a user's selection of an online transaction service by clicking a button on a user interface).

Figure 4:
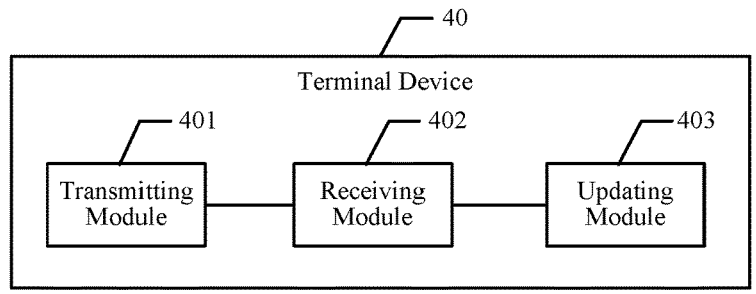
FIG. 4 is a block diagram illustrating modules of a terminal device for updating a configuration of software installed at the terminal device in accordance with some embodiments.

FIG. 4 is a block diagram illustrating modules of a terminal device 40 for updating a configuration of software installed at the terminal device 40 in accordance with some embodiments. The terminal device 40 can be structurally and functionally similar to the terminal devices described with respect to FIGS. 1-3. Particularly, the terminal device 40 can be operatively coupled to and communicate with one or more server devices (not shown in FIG. 4) similar to the server devices described with respect to FIGS. 1-3, such that the terminal device 40 can update software configuration parameters associated with software application(s) installed at the terminal device 40. As shown in FIG. 4, the terminal device 40 includes a transmitting module 401, a receiving module 402, and an updating module 403. In some embodiments, the terminal device 40 can include more or less modules than those shown in FIG. 4.

In some embodiments, each module included in the terminal device 40 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the terminal device 40 (not shown in FIG. 4) and executed at a processor (e.g., a CPU) of the terminal device 40 (not shown in FIG. 4). Overall, the transmitting module 401, the receiving module 402 and the updating module 403 can be configured to collectively perform at least a portion (e.g., a client-side portion) of the methods 100-300 shown and described with respect to FIGS. 1-3.

Specifically, the transmitting module 401 is configured to, among other functions, send requests for updating software configurations to the one or more server devices. As described above with respect to the methods 100-300 in FIGS. 1-3, each request sent from the transmitting module 401 can be associated with a particular software configuration parameter group. Such a request can include, for example, a current version number of the software configuration parameter group that is stored at the terminal device 40.

The receiving module 402 is configured to, among other functions, receive data and information (e.g., version number) associated with software configuration updates from the one or more server devices. As described above with respect to the methods 100-300 in FIGS. 1-3, the receiving module 402 can receive the up-to-date data of a software configuration parameter group along with a latest version number of the software configuration parameter group. In some embodiments, the receiving module 402 receives from a server device the data and latest version number of a software configuration parameter group in accordance with a determination made at the server device that the current version number included in a corresponding request is different from the latest version number, which indicates that the data and the current version number of the software configuration parameter group stored at the terminal device 40 are outdated.

The updating module 403 is configured to, among other functions, update data and information (e.g., version number) associated with software configuration updates that are received from the one or more server devices. Particularly, the updating module 403 can be configured to perform operations of 308 of the method 300 as described above with respect to FIG. 3. Specifically, the updating module 403 can be configured to update data of a software configuration parameter group based on the up-to-date data of the software configuration parameter group that is received at the receiving module 402. Meanwhile, the updating module 403 can be configured to update a current version number of the software configuration parameter group based on the latest version number of the software configuration parameter group that is received at the receiving module 402. As a result, data and information of the software configuration parameter group stored at the terminal device 40 are updated by the updating module 403 based on the data and information received at the receiving module 402.

Figure 5:
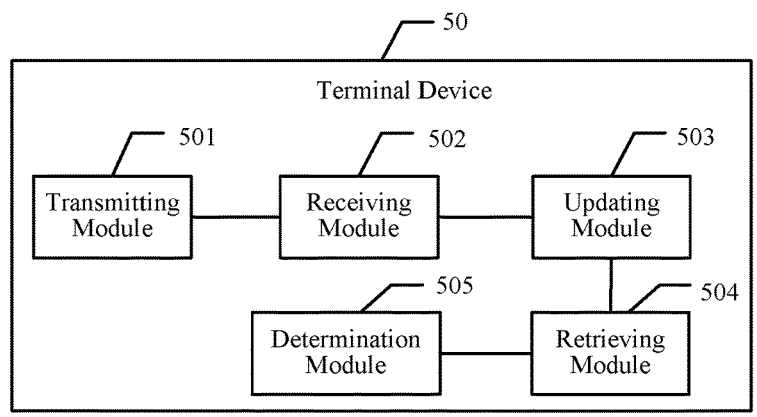
FIG. 5 is a block diagram illustrating modules of a terminal device for updating a configuration of software installed at the terminal device in accordance with some other embodiments.

FIG. 5 is a block diagram illustrating modules of a terminal device 50 for updating a configuration of software installed at the terminal device 50 in accordance with some other embodiments. The terminal device 50 can be structurally and functionally similar to the terminal device 40 shown and described with respect to FIG. 4. Particularly, the terminal device 50 can be operatively coupled to and communicate with one or more server devices (not shown in FIG. 5) similar to the server devices described with respect to FIGS. 1-3, such that the terminal device 50 can update software configuration parameters associated with software application(s) installed at the terminal device 50. As shown in FIG. 5, the terminal device 50 includes a transmitting module 501, a receiving module 502, an updating module 503, a retrieving module 504 and a determination module 505. In some embodiments, the terminal device 50 can include more or less modules than those shown in FIG. 5.

In some embodiments, each module included in the terminal device 50 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the terminal device 50 (not shown in FIG. 5) and executed at a processor (e.g., a CPU) of the terminal device 50 (not shown in FIG. 5). Overall, the transmitting module 501, the receiving module 502, the updating module 503, the retrieving module 504 and the determination module 505 can be configured to collectively perform at least a portion (e.g., a client-side portion) of the methods 100-300 shown and described with respect to FIGS. 1-3.

Specifically, the transmitting module 501, the receiving module 502 and the updating module 503 can be structurally and functionally similar to the transmitting module 401, the receiving module 402 and the updating module 403, respectively, as described above with respect to FIG. 4. The retrieving module 504 is configured to, among other functions, retrieve from the received data application procedure control codes associated with the software applications installed at the terminal device 50. That is, the retrieving module 504 can be configured to perform a portion of the operations of 310 in the method 300 as described above with respect to FIG. 3. The determination module 505 is configured to, among other functions, determine a responding procedure based on an application procedure control code retrieved by the retrieving module 504. That is, the determination module 505 can be configured to perform a portion of the operations of 310 and the operations of 312 in the method 300 as described above with respect to FIG. 3. In some embodiments, functions performed by the determination module 505 can be further subdivided into two submodules as shown and described below with respect to FIG. 6.

Figure 6:
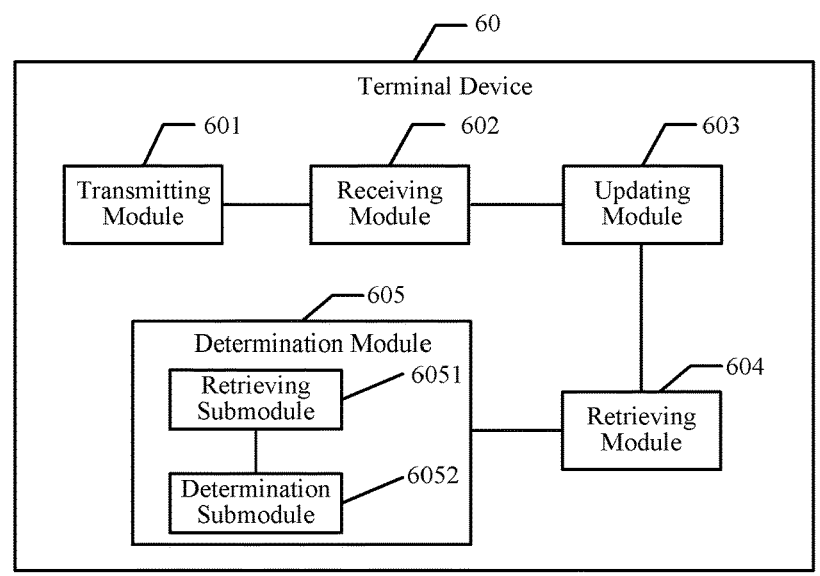
FIG. 6 is a block diagram illustrating modules of a terminal device for updating a configuration of software installed at the terminal device in accordance with yet some other embodiments.

FIG. 6 is a block diagram illustrating modules of a terminal device 60 for updating a configuration of software installed at the terminal device in accordance with yet some other embodiments. The terminal device 60 can be structurally and functionally similar to the terminal devices 40, 50 shown and described with respect to FIGS. 4 and 5. Particularly, the terminal device 60 can be operatively coupled to and communicate with one or more server devices (not shown in FIG. 6) similar to the server devices described with respect to FIGS. 1-3, such that the terminal device 60 can update software configuration parameters associated with software application(s) installed at the terminal device 60. As shown in FIG. 6, the terminal device 60 includes a transmitting module 601, a receiving module 602, an updating module 603, a retrieving module 604 and a determination module 605 that further includes a retrieving submodule 6051 and a determination submodule 6052. In some embodiments, the terminal device 60 can include more or less modules than those shown in FIG. 6.

In some embodiments, each module or submodule included in the terminal device 60 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module or submodule can be stored in a memory of the terminal device 60 (not shown in FIG. 6) and executed at a processor (e.g., a CPU) of the terminal device 60 (not shown in FIG. 6). Overall, the transmitting module 601, the receiving module 602, the updating module 603, the retrieving module 604 and the determination module 605 (including the retrieving submodule 6051 and the determination submodule 6052) can be configured to collectively perform at least a portion (e.g., a client-side portion) of the methods 100-300 shown and described with respect to FIGS. 1-3.

Specifically, the transmitting module 601, the receiving module 602 and the updating module 603 can be structurally and functionally similar to the transmitting module 401, the receiving module 402 and the updating module 403, respectively, as described above with respect to FIG. 4. The retrieving module 604 and the determination module 605 can be structurally and functionally similar to the retrieving module 504 and the determination module 505, respectively, as described above with respect to FIG. 5. Furthermore, the retrieving submodule 6051 is configured to, among other functions, determine an association between a retrieved application procedure control code and a responding procedure based on the received data. That is, the retrieving submodule 6501 is configured to perform a portion of the operations of 310 in the method 300 as described above with respect to FIG. 3. The determination submodule 6052 is configured to, among other functions, determine a responding procedure based on an application procedure control code and an association between the application procedure control code and the responding procedure. The application procedure control code is retrieved by the retrieving module 604, and the association is determined by the retrieving submodule 6051. That is, the determination submodule 6052 is configured to perform operations of 312 in the method 300 as described above with respect to FIG. 3.

Figure 7:
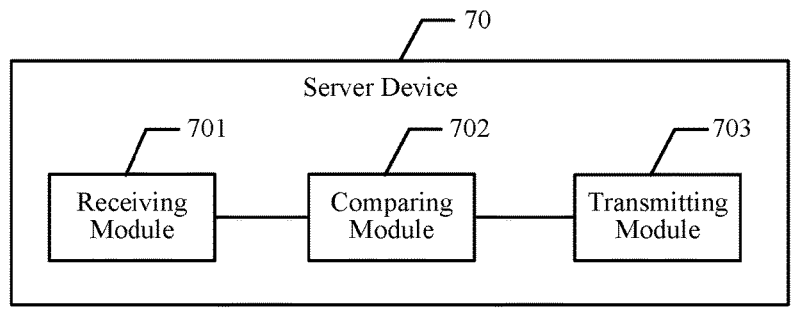
FIG. 7 is a block diagram illustrating modules of a server device for updating a configuration of software installed at a terminal device in accordance with some embodiments.

FIG. 7 is a block diagram illustrating modules of a server device 70 for updating a configuration of software installed at a terminal device in accordance with some embodiments. The server device 70 can be structurally and functionally similar to the server devices described with respect to FIGS. 1-3. Particularly, the server device 70 can be operatively coupled to and communicate with one or more terminal devices (not shown in FIG. 7) similar to the terminal devices shown and/or described with respect to FIGS. 1-6, such that the terminal device(s) can update software configuration parameters associated with software application(s) installed at the terminal device(s). As shown in FIG. 7, the server device 70 includes a receiving module 701, a comparing module 702, and a transmitting module 703. In some embodiments, the server device 70 can include more or less modules than those shown in FIG. 7.

In some embodiments, each module included in the server device 70 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the server device 70 (not shown in FIG. 7) and executed at a processor (e.g., a CPU) of the server device 70 (not shown in FIG. 7). Overall, the receiving module 701, the comparing module 702 and the transmitting module 703 can be configured to collectively perform at least a portion (e.g., server-side portion) of the methods 100-300 shown and described with respect to FIGS. 1-3.

Specifically, the receiving module 701 is configured to, among other functions, receive requests for updating software configurations from the one or more terminal devices. As described above with respect to the methods 100-300 in FIGS. 1-3, each request received at the receiving module 701 can be associated with a particular software configuration parameter group. Such a request can include, for example, a current version number of the software configuration parameter group that is stored at the terminal device that sends the request.

The comparing module 702 is configured to, among other functions, compare version numbers included in the requests received by the receiving module 701 with corresponding latest version numbers stored at the server device 70. As a result, the comparing module 702 determines whether data and version number of a software configuration parameter group stored at an associated terminal device are up-to-date. In other words, the comparing module 702 is configured to perform the operations of 202 in the method 200 and the operations of 304 in the method 300 as described above with respect to FIGS. 2 and 3.

The transmitting module 703 is configured to, among other functions, transmit data and information (e.g., version number) associated with software configuration updates to the one or more terminal devices. As described above with respect to the methods 100-300 in FIGS. 1-3, the transmitting module 703 can transmit, to a terminal device, the up-to-date data of a software configuration parameter group along with a latest version number of the software configuration parameter group. In some embodiments, the transmitting module 703 transmits to a terminal device the data and latest version number of a software configuration parameter group in accordance with a determination made by the comparing module 702 that the current version number included in a corresponding request is different from the latest version number, which indicates that the data and the current version number of the software configuration parameter group stored at the terminal device are outdated.

Figure 8:
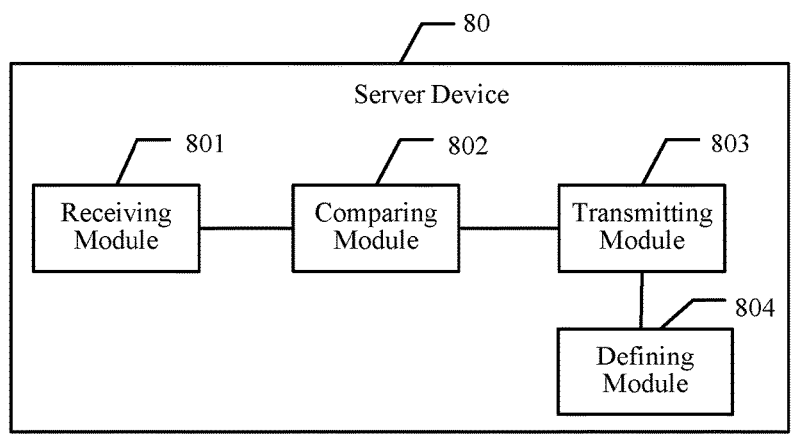
FIG. 8 is a block diagram illustrating modules of a server device for updating a configuration of software installed at a terminal device in accordance with some other embodiments.

FIG. 8 is a block diagram illustrating modules of a server device 80 for updating a configuration of software installed at a terminal device in accordance with some other embodiments. The server device 80 can be structurally and functionally similar to the server device 70 shown and described with respect to FIG. 7. Particularly, the server device 80 can be operatively coupled to and communicate with one or more terminal devices (not shown in FIG. 8) similar to the terminal devices shown and/or described with respect to FIGS. 1-6, such that the terminal device(s) can update software configuration parameters associated with software application(s) installed at the terminal device(s). As shown in FIG. 8, the server device 80 includes a receiving module 801, a comparing module 802, a transmitting module 803 and a defining module 804. In some embodiments, the server device 80 can include more or less modules than those shown in FIG. 8.

In some embodiments, each module included in the server device 80 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the server device 80 (not shown in FIG. 8) and executed at a processor (e.g., a CPU) of the server device 80 (not shown in FIG. 8). Overall, the receiving module 801, the comparing module 802, the transmitting module 803 and the defining module 804 can be configured to collectively perform at least a portion (e.g., a server-side portion) of the methods 100-300 shown and described with respect to FIGS. 1-3.

Specifically, the receiving module 801, the comparing module 802 and the transmitting module 803 can be structurally and functionally similar to the receiving module 701, the comparing module 702 and the transmitting module 703, respectively, as described above with respect to FIG. 7. The defining module 804 is configured to, among other functions, define new application procedure control codes that are associated with and/or used to Control new responding procedures based on updated parameters of the software configuration. In some embodiments, the defining module 804 is configured to define a new application procedure control code associated with a software configuration parameter group prior to the transmitting module 803 sending data of the software configuration parameter group to a terminal device. In such embodiments, the new application procedure control code defined by the defining module 804 can be included in the data sent by the transmitting module 803 to the terminal device.

Figure 9:
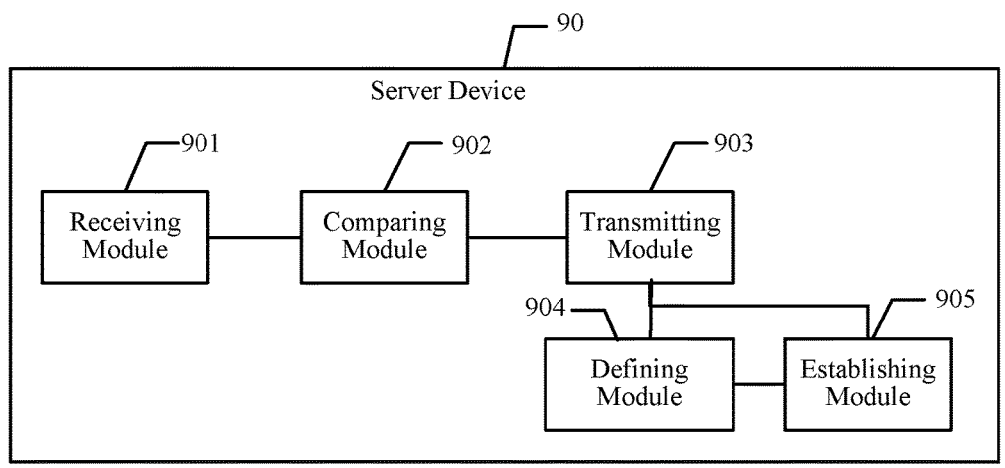
FIG. 9 is a block diagram illustrating modules of a server device for updating a configuration of software installed at a terminal device in accordance with yet some other embodiments.

FIG. 9 is a block diagram illustrating modules of a server device 90 for updating a configuration of software installed at a terminal device in accordance with yet some other embodiments. The server device 90 can be structurally and functionally similar to the server devices 70, 80 shown and described with respect to FIGS. 7 and 8. Particularly, the server device 90 can be operatively coupled to and communicate with one or more terminal devices (not shown in FIG. 9) similar to the terminal devices shown and/or described with respect to FIGS. 1-6, such that the terminal device(s) can update software configuration parameters associated with software application(s) installed at the terminal device(s). As shown in FIG. 9, the server device 90 includes a receiving module 901, a comparing module 902, a transmitting module 903, a defining module 904 and an establishing module 905. In some embodiments, the server device 90 can include more or less modules than those shown in FIG. 9.

In some embodiments, each module included in the server device 90 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules.

Instructions or code of each module can be stored in a memory of the server device 90 (not shown in FIG. 9) and executed at a processor (e.g., a CPU) of the server device 90 (not shown in FIG. 9). Overall, the receiving module 901, the comparing module 902, the transmitting module 903, the defining module 904 and the establishing module 905 can be configured to collectively perform at least a portion (e.g., a server-side portion) of the methods 100-300 shown and described with respect to FIGS. 1-3.

Specifically, the receiving module 901, the comparing module 902 and the transmitting module 903 can be structurally and functionally similar to the receiving module 701, the comparing module 702 and the transmitting module 703, respectively, as described above with respect to FIG. 7. The defining module 904 can be structurally and functionally similar to the defining module 804 described above with respect to FIG. 8. The establishing module 905 is configured to, among other functions, establish (or define, determine) an association between a newly-defined application procedure control code associated with a software configuration parameter group and a new responding procedure associated with the same software configuration parameter group. Furthermore, the defining module 904 can be configured to include the newly-established association in the up-to-date data of the software configuration parameter group, such that the newly-established association can be sent to the associated terminal device along with the newly-defined application procedure control code.

Figure 10:
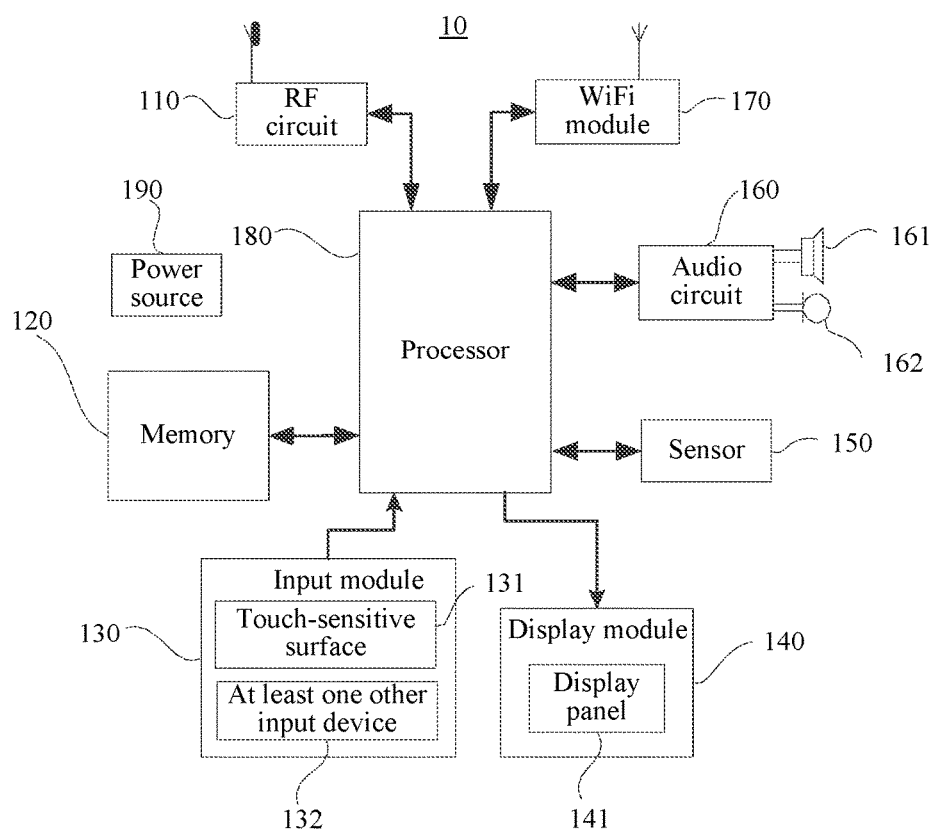
FIG. 10 is a block diagram illustrating components of a terminal device in accordance with some embodiments.

FIG. 10 is a block diagram illustrating components of a terminal device 10 in accordance with some embodiments. The terminal device 10 can be structurally and functionally similar to the terminal devices shown and described above with respect to FIGS. 1-6. For example, the terminal device 10 can be a cellular phone, a smart phone, a MID, a PDA, a tablet computer, an e-reader, a laptop computer, a handheld computer, a wearable device, a desktop computer, a vehicle terminal, etc. The terminal device 10 can be configured to perform at least a portion (e.g., a client-side portion) of the methods 100-300 shown and described above with respect to FIGS. 1-3.

As shown in FIG. 10, the terminal device 10 includes a radio frequency (RF) circuit 110, a memory 120 comprising of one or more computer-readable storage media, an input module 130, a display module 140, a sensor 150, an audio circuit 160, a Wi-Fi (Wireless Fidelity) module 170, a processor 180 including one or more processing cores, a power supply 190, and/or other components (not shown in FIG. 10). One skilled in the art understands that the structure of the terminal device 10 shown in FIG. 10 does not constitute a limitation for the terminal device 10, and may include more or less components than those illustrated in FIG. 10. Furthermore, the components of the terminal device 10 (shown or not shown in FIG. 10) can be combined and/or arranged in different ways other than that shown in FIG. 10.

The RF circuit 110 is configured to send and receive data, and in particular, to send uplink data to and/or receive downlink data from a base station (e.g., a server device). The RF circuit 110 is configured to send the received data to the processor 180 for further processing. The RF circuit 110 can include, for example, at least one of an antenna, amplifier, tuner, oscillator, subscriber identity module (SIM) card, transceiver, coupler, low noise amplifier (LNA), duplexer, etc. The RF circuit 110 is configured to wirelessly communicate with other network or devices (e.g., server devices) using any suitable wireless communication protocol such as, for example, GSM, GPRS, CDMA, WCDMA, LTE, etc.

The memory 120 is configured to store software programs and/or modules. The processor 180 can execute various applications and data processing functions included in the software programs and/or modules stored in the memory 120. The memory 120 includes, for example, a program storage area and a data storage area. The program storage area is configured to store, for example, an operating system and application programs. The data storage area is configured to store data received and/or generated during the use of the terminal device 10 (e.g., version numbers, parameter values, etc.). The memory 120 can include one or more high-speed RAM, non-volatile memory such as a disk storage device and a flash memory device, a non-volatile random access memory (NVRAM), and/or other volatile solid state memory devices. In some embodiments, the memory 120 also includes memory controller configured to provide the processor 180 and the input module 130 with access to the memory 120.

The input module 130 is configured to receive input data and signals (e.g., data associated with software configuration, updated values of software configuration parameters) and also generate signals caused by operations and manipulations of input devices such as, for example, a user's finger, a touch pen, a keyboard, a mouse, etc. Specifically, the input module 130 includes a touch-sensitive surface 131 (also known as touch screen or touchpad) and at least one other input device 132. The touch-sensitive surface 131 is configured to collect touch operations on or near the touch-sensitive surface 131 that are performed by a user of the terminal device 10, such as operations performed by the user using a finger, stylus, touch pen, or any other suitable object or attachment on or near the touch-sensitive surface 131. In some embodiments, the touch-sensitive surface 131 can optionally include a touch detection apparatus and a touch controller (not shown in FIG. 10). The touch detection apparatus can detect the direction of the touch operation and signals generated by the touch operation, and then transmit the signals to the touch controller. The touch controller can receive the signals from the touch detection apparatus, convert the signals into contact coordinate data, and then send the contact coordinate data to the processor 180. The touch controller can also receive and execute commands received from the processor 180. The touch-sensitive surface 131 can be implemented using various types of technologies such as, for example, resistive touch screen, capacitive touch screen, infrared ray touch screen, surface acoustic wave (SAW) touch screen, etc. The other input devices 132 can include, for example, a physical keyboard, a function key (such as a volume control key, a switch key, etc.), a trackball, a mouse, a joystick, etc.

The display module 140 is configured to display information entered by the user, information provided to the user, various graphical user interfaces (GUIs) of the terminal device 10, and/or the like. The GUIs can include, for example, graph, text, icon, video, and/or any combination of them. The display module 140 includes a display panel 141, which can be, for example, a liquid crystal display (LCD), a light-emitting diode (LED) display, an organic light-emitting diode (OLED) display, etc. Furthermore, the touch-sensitive surface 131 can cover the display panel 141. After a touch operation on or near the touch-sensitive, surface 131 is detected, the touch-sensitive surface 131 transmits information of the touch operation to the processor 180, where the type and/or other information of the touch operation is determined. The processor 180 sends visual information to the display panel 141 based on the determined type of the touch operation. The visual information is then displayed on the display panel 141. Although shown in FIG. 10 as two separate components for the input and output functions respectively, in other embodiments, the touch-sensitive surface 131 and the display panel 141 can be integrated into one component for realization of the input and output functions.

The terminal device 10 includes at least one sensor 150 such as, for example, a light sensor, a motion sensor, and/or other types of sensors. A light sensor can be, for example, an ambient light sensor or a proximity sensor. The ambient light sensor is configured to adjust the brightness of the display panel 141 according to the light intensity received at the ambient light sensor. The proximity sensor is configured to turn off the display panel 141 and/or backlight when the terminal device 10 moves near the user's ear. A motion sensor can be, for example, an acceleration transducer that can measure acceleration at each direction (e.g., 3-axis directions), measure the magnitude and direction of gravity when stationary, be used in applications for recognition of the posture of the terminal device 10 (e.g., horizontal and vertical screen switching, games, magnetometer posture calibration), be used in applications related to vibration recognition (e.g., pedometer, percussion), and/or the like. Additionally, although not shown in FIG. 10, the terminal device 10 can also include other sensory devices such as, for example, a gyroscope, a barometer, a hygrometer, a thermometer, an infrared sensor, and/or the like.

The audio circuit 160, the speaker 161 and the microphone 162 collectively provide an audio interface between the user and the terminal device 10. The audio circuit 160 transmits an electric signal converted from audio data to the speaker 161, where the electric signal is converted and output as an acoustical signal by the speaker 161. The microphone 162 converts a collected acoustical signal into an electric signal, which is then sent to and converted to audio data by the audio circuit 160. The audio data is sent to the processor 180 for further processing, and then sent to another terminal device through the RF circuit 110 or stored in the memory 120 for further processing. The audio circuit 160 can also include an earplug jack to enable communication between a peripheral headset and the terminal device 10.

The Wi-Fi module 170 is configured to enable Wi-Fi communication between the terminal device 10 and other devices or network. Thus, the module 170 provides the user with a wireless access to broadband Internet. As a result, the user can use the Wi-Fi connection to, for example, send and receive E-mails, browse web pages, access streaming media, and so on. Although shown in FIG. 10 as including the Wi-Fi module 170, in some other embodiments, a terminal device can operate without such a Wi-Fi module or the Wi-Fi functionality.

The processor 180 functions as a control center of the terminal device 10. The processor 180 is configured to operatively connect each component of the terminal device 10 using various interfaces and circuits. The processor 180 is configured to execute the various functions of the terminal device 10 and to perform data processing by operating and/or executing the software programs and/or modules stored in the memory 120 and using the data stored in the memory 120. In some embodiments, the processor 180 can include one or more processing cores. In some embodiments, an application processor and a modem processor can be integrated at the processor 180. The application processor is configured to monitor and control the operating system, user interfaces, application programs, and so on. The modem processor is configured to control wireless communication.

The power supply 190 is used to provide power for the various components of the terminal device 10. The power supply 190 can be, for example, a battery. The power supply 190 can be operatively coupled to the processor 180 via a power management system that controls charging, discharging, power consumption, and/or other functions related to power management. In some embodiments, the power supply 190 can include one or more DC and/or AC power source, recharging system, power failure detection circuit, power converter or inverter, power supply status indicator, and/or the like.

Although not shown in FIG. 10, in some embodiments, the terminal device 10 can include, for example, a camera, a Bluetooth module, and/or other suitable components. The terminal device 10 can be configured to perform the software configuration updating procedures (e.g., the methods 100-300) described above with respect to FIGS. 1-3. Specifically, instructions or code of the programs and/or modules stored in the memory 120, when executed at the processor 180, can perform at least a portion (e.g., a client-side portion) of the operations of the methods 100-300 as described above with respect to FIGS. 1-3.

Figure 11:
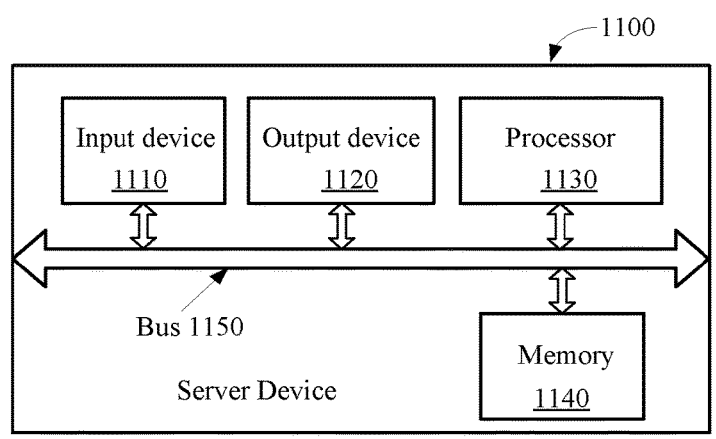
FIG. 11 is a block diagram illustrating components of a server device in accordance with some embodiments.

FIG. 11 is a block diagram illustrating components of a server device 1100 in accordance with some embodiments. The server device 1100 can be structurally and functionally similar to the server devices shown and/or described above with respect to FIGS. 1-3 and 7-9. Particularly, the server device 1100 can be operatively coupled to and communicate with one or more terminal devices (not shown in FIG. 11) similar to the terminal devices shown and/or described with respect to FIGS. 1-6 and 10, such that the terminal device(s) can update software configuration parameters associated with software application(s) installed at the terminal device(s). As shown in FIG. 11, the server device 1100 includes a processor 1130, an input device 1110, an output device 1120, a memory 1140, and a bus 1150. In some embodiments, a server device can include more or less devices, components and/or modules than those shown in FIG. 11.

The processor 1130 can be any processing device capable of performing at least a portion (e.g., a server-side portion) of the methods 100-300 described above with respect to FIGS. 1-3. Such a processor can be, for example, a CPU, a DSP, an ASIC, a FPGA, and/or the like. The processor 1130 can be configured to control the operations of other components and/or modules of the server device 1100. For example, the processor 1130 can be configured to control operations of the input device 1110 and the output device 1120. For another example, the processor 1130 can be configured to execute instructions or code stored in a software program or module (e.g., updating software configuration parameters) within the memory 1140.

The memory 1140 can include, for example, a random-access memory (RAM) (e.g., a DRAM, a SRAM, a DDR RAM, etc.), a non-volatile memory such as a non-volatile random access memory (NVRAM), one or more magnetic disk storage devices, optical disk storage devices, flash memory devices, or other non-volatile solid state storage devices. In some embodiments, the memory 1140 can include one or more storage devices (e.g., removable memory) remotely located from other components of the server device 1100.

The bus 1150 is configured to implement connections and communication among the other components of the server device 1100. The bus 1150 can include a combination of various types of buses such as, for example, a data bus, a power bus, a control bus, a status signaling bus, and/or the like. The input device 1110 can be any suitable device that can be used to receive data from terminal devices communicating with the server device 1100. In some embodiments, operations of the input device 1110 are controlled by a receiving module (e.g., the receiving modules 701, 801, 901 in FIGS. 7-9) of the server device 1100. Similarly, the output device 1120 can be any suitable device that can be used to transmit data to terminal devices communicating with the server device 1100. In some embodiments, operations of the output device 1120 are controlled by a transmitting module (e.g., the transmitting modules 703, 803, 903 in FIGS. 7-9) of the server device 1100.

Figure 12:
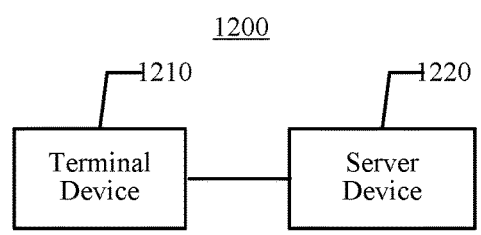
FIG. 12 is a schematic diagram illustrating a system for updating a configuration of software installed at a terminal device in accordance with some embodiments.

FIG. 12 is a schematic diagram illustrating a system 1200 for updating a configuration of software installed at a terminal device 1210 in accordance with some embodiments. As shown in FIG. 12, the system 1200 includes the terminal device 1210 and the server device 1220. The terminal device 1210 is operatively coupled to and communicates with the server device 1220. The terminal device 1210 can be structurally and functionally similar to the terminal devices shown and described above with respect to FIGS. 1-6 and 10. The server device 1220 can be structurally and functionally similar to the server devices shown and described above with respect to FIGS. 1-3, 7-9 and 11. In operation, the system 1200 is configured to maintain and upgrade software installed at the terminal device 1210 by performing the methods 100-300 as described above with respect to FIGS. 1-3.

While methods for updating parameters associated with a single software configuration parameter group at a terminal device being shown and described with respect to FIGS. 1-3, in some other embodiments, parameters of multiple software configuration parameter groups can be updated at one or more terminal devices in a similar method. For example, parameters of different software configuration parameter groups can be independently updated at a terminal device using the same Method (e.g., methods 100-300), at the same time (or substantially the same time) or different times.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of updating a configuration of software, comprising:

at a terminal device having one or more processors and memory for storing programs to be executed by the one or more processors:

sending, to a server device, a request for updating the configuration of the software, the request including at least a version number of a first software configuration parameter group corresponding to a first portion of the software and a version number of a second software configuration parameter group corresponding to a second portion of the software that is distinct from the first portion of the software, each software configuration parameter group including a group of parameters associated with the configuration of the corresponding portion of the software;

receiving, from the server device and in response to the request, data of the first software configuration parameter group and a latest version number of the first software configuration parameter group, wherein the server device is configured to choose the latest version number of the first software configuration parameter group from a plurality of software configuration parameter groups when the latest version number of the first software configuration parameter group is different than the version number of the first software configuration parameter group included in the request and skip a latest version number of the second software configuration parameter group from the plurality of software configuration parameter groups when the latest version number of the second software configuration parameter group is the same as the version number of the second software configuration parameter group included in the request, wherein each software configuration parameter group in the plurality of software configuration parameter groups represents a unique portion of the software, and each parameter in each software configuration parameter group is associated with the configuration of only the corresponding unique portion of the software; and updating the configuration of the software based on the received data of the first software configuration parameter group, and updating the version number of the first software configuration parameter group based on the received latest version number of the first software configuration parameter group, wherein updating the configuration of the software further comprises upgrading the first portion of the software corresponding to the first software configuration parameter group.

2. The method of claim 1, wherein the data of the first software configuration parameter group includes an application procedure control code associated with an application of the software, the method further comprising:

determining a responding procedure based on the application procedure control code when the application of the software is executed at the terminal device.

3. The method of claim 2, wherein the determining the responding procedure includes:

determining an association between the application procedure control code and the responding procedure; and determining the responding procedure based on the application procedure control code and the association when the application of the software is executed at the terminal device.

4. The method of claim 1, wherein each software configuration parameter group from the plurality of software configuration parameter groups includes a predefined group of parameters associated with the configuration of the software.

5. The method of claim 1, wherein sending the request includes sending the request in response to receiving, from the server device, an indication that the version number of the first software configuration parameter group has been updated at the server device.

6. The method of claim 1, wherein sending the request includes sending the request to the server device in accordance with a predefined periodic schedule.

7. A method of updating a configuration of software, comprising:

at a server device having one or more processors and memory for storing programs to be executed by the one or more processors:

receiving, from a terminal device, a request for updating the configuration of the software, the request including at least a version number of a first software configuration parameter group corresponding to a first portion of the software and a version number of a second software configuration parameter group corresponding to a second portion of the software that is distinct from the first portion of the software, each software configuration parameter group including a group of parameters associated with the configuration of the corresponding portion of the software;

comparing the version number of the first software configuration parameter group included in the request with a latest version number of the first software configuration parameter group stored at the server device;

comparing the version number of the second software configuration parameter group included in the request with a latest version number of the second software configuration parameter group stored at the server device;

in accordance with a determination that the version number of the first software configuration parameter group included in the request is different from the latest version number of the first software configuration parameter group stored at the server device:

selecting the latest version number of the first software configuration parameter group from a plurality of software configuration parameter groups, wherein each software configuration parameter group in the plurality of software configuration parameter groups represents a unique portion of the software and each parameter in each software configuration parameter group is associated with the configuration of only the corresponding unique portion of the software; and sending, to the terminal device, data of the first software configuration parameter group and the latest version number of the first software configuration parameter group such that the terminal device updates the configuration of the software based on the data of the first software configuration parameter group and updates the version number of the first software configuration parameter group based on the latest version number of the first software configuration parameter group, wherein updating the configuration of the software further comprises upgrading the first portion of the software corresponding to the first software configuration parameter group; and in accordance with a determination that the version number of the second software configuration parameter group included in the request is the same as the latest version number of the second software configuration parameter group stored at the server device:

refraining from sending, to the terminal device, data of the second software configuration parameter group.

8. The method of claim 7, further comprising:

defining an application procedure control code associated with an application of the software; and including the application procedure control code in the data of the first software configuration parameter group such that the terminal device receives the application procedure control code and determines a responding procedure based on the application procedure control code when the application of the software is executed at the terminal device.

9. The method of claim 8, further comprising:

defining an association between the application procedure control code and the responding procedure; and including the association in the data of the first software configuration parameter group such that the terminal device retrieves the association and determines the responding procedure based on the application procedure control code and the association when the application of the software is executed at the terminal device.

10. The method of claim 7, wherein, each software configuration parameter group from the plurality of software configuration parameter groups includes a predefined group of parameters associated with the configuration of the software.

11. The method of claim 7, further comprising, prior to receiving the request:
   updating the data of the first software configuration parameter group;
   updating the version number of the first software configuration parameter group to the latest version number of the first software configuration parameter group; and
   sending, to the terminal device, an indication that the version number of the first software configuration parameter group has been updated at the server device.

12. A server device, comprising:
   one or more processors; and
   memory storing one or more programs to be executed by the one or more processors, the one or more programs comprising instructions for:
      receiving, from a terminal device, a request for updating a configuration of software, the request including at least a first version number of a first software configuration parameter group corresponding to a first portion of the software and a version number of a second software configuration parameter group corresponding to a second portion of the software that is distinct from the first portion of the software, each software configuration parameter group including a group of parameters associated with the configuration of the corresponding portion of the software;
      comparing the version number of the first software configuration parameter group included in the request with a latest version number of the first software configuration parameter group stored at the server device;
      comparing the version number of the second software configuration parameter group included in the request with a latest version number of the second software configuration parameter group stored at the server device;
      in accordance with a determination that the version number of the first software configuration parameter group included in the request is different from the latest version number of the first software configuration parameter group stored at the server device:
         selecting the latest version of the first software configuration parameter group from a plurality of software configuration parameter groups, wherein each software configuration parameter group in the plurality of software configuration parameter groups represents a unique portion of the software and each parameter in each software configuration parameter group is associated with the configuration of only the corresponding unique portion of the software; and
         sending, to the terminal device, data of the first software configuration parameter group and the latest version number of the first software configuration parameter group such that the terminal device updates the configuration of the software based on the data of the first software configuration parameter group and updates the version number of the first software configuration parameter group based on the latest version number of the first software configuration parameter group, wherein updating the configuration of the software further comprises upgrading the first portion of the software corresponding to the first software configuration parameter group; and
      in accordance with a determination that the version number of the second software configuration parameter group included in the request is the same as the latest version number of the second software configuration parameter group stored at the server device:
         refraining from sending, to the terminal device, data of the second software configuration parameter group.

13. The server device of claim 12, wherein the one or more programs further comprises instructions for:
   defining an application procedure control code associated with an application of the software; and
   including the application procedure control code in the data of the first software configuration parameter group such that the terminal device receives the application procedure control code and determines a responding procedure based on the application procedure control code when the application of the software is executed at the terminal device.

14. The server device of claim 13, wherein the one or more programs further comprises instructions for:
   defining an association between the application procedure control code and the responding procedure; and
   including the association in the data of the first software configuration parameter group such that the terminal device retrieves the association and determines the responding procedure based on the application procedure control code and the association when the application of the software is executed at the terminal device.

15. The server device of claim 12, wherein, each software configuration parameter group from the plurality of software configuration parameter groups includes a predefined group of parameters associated with the configuration of the software.

16. The server device of claim 12, wherein the one or more programs further comprises instructions for, prior to receiving the request:
   updating the data of the first software configuration parameter group;
   updating the version number of the first software configuration parameter group to the latest version number of the first software configuration parameter group; and
   sending, to the terminal device, an indication that the version number of the first software configuration parameter group has been updated at the server device.

17. The server device of claim 12, wherein receiving the request includes receiving the request from the terminal device in accordance with a predefined periodic schedule.

* * * * *